(12) United States Patent
Furukawa

(10) Patent No.: US 8,468,346 B2
(45) Date of Patent: Jun. 18, 2013

(54) DATA REFERENCE SYSTEM, DATABASE PRESENTATION/DISTRIBUTION SYSTEM, AND DATA REFERENCE METHOD

(75) Inventor: Jun Furukawa, Tokyo (JP)

(73) Assignee: NEC Corporation, Tokyo (JP)

( * ) Notice: Subject to any disclaimer, the term of this patent is extended or adjusted under 35 U.S.C. 154(b) by 297 days.

(21) Appl. No.: 13/062,455

(22) PCT Filed: Oct. 29, 2009

(86) PCT No.: PCT/JP2009/068563
§ 371 (c)(1),
(2), (4) Date: Mar. 4, 2011

(87) PCT Pub. No.: WO2010/053036
PCT Pub. Date: May 14, 2010

(65) Prior Publication Data
US 2011/0202764 A1    Aug. 18, 2011

(30) Foreign Application Priority Data
Nov. 5, 2008 (JP) .................................. 2008-284777

(51) Int. Cl.
*H04L 29/06* (2006.01)
(52) U.S. Cl.
USPC ......................................................... 713/167
(58) Field of Classification Search
USPC ......................................................... 713/167
See application file for complete search history.

(56) References Cited

U.S. PATENT DOCUMENTS
2002/0026345 A1  2/2002 Juels
2004/0193905 A1* 9/2004 Lirov et al. ................... 713/193

FOREIGN PATENT DOCUMENTS
JP   2004318391 A   11/2004
JP   2006172433 A    6/2006

OTHER PUBLICATIONS

International Search Report for PCT/JP2009/068563 mailed Jan. 26, 2010.
R. Noumeir et al., "Pseudonymization of Radiology Data for Research Purposes", Journal of Digital Imaging, vol. 20, No. 3, 2007, pp. 284-295.
J. Furukawa. "Efficient and Verifiable Shuffling and Shuffle-Decryption", IEICE Transactions, vol. E88-A, No. 1, Jan. 2005, pp. 172-188.
J. Furukawa et al., "An Efficient Publicly Verifiable Mix-net for Long Inputs", IEICE Transactions, vol. E90-A, No. 1, Jan. 2007, pp. 113-127.
T. Nakanishi et al., "Anonymous Statistical Survey of Attributes", ACISP 2001, Lecture Notes in Computer Science, vol. 2119, 2001, pp. 460-473.

* cited by examiner

*Primary Examiner* — Jacob Lipman

(57) ABSTRACT

An element-data generating device encrypts respective vectors each including plural pieces of data, generates a vector including encrypted texts, and outputs such a vector as element data. A database generating system has plural first distributed devices and outputs a sequence of all pieces of element data as a database. A database presentation system has plural second distributed devices, generates, based on a reference item specifying an item to be referred, plural sequences of data to be referred from the database, and performs order shuffling of individual elements of the sequences of the data by all of the second distributed devices so that the order shuffling of the elements of the data sequence is consistent throughout all data sequences.

7 Claims, 13 Drawing Sheets

DATA REFERENCE SYSTEM, DATABASE PRESENTATION/DISTRIBUTION SYSTEM, AND DATA REFERENCE METHOD

TECHNICAL FIELD

The present invention relates to a data reference system, and more specifically, to a data reference system that refers to a database including data to which a label suitable to be kept in secret exceptionally is added like data belonging to an individual in the database. Moreover, the present invention relates to a database presentation/distribution system and a data reference method.

BACKGROUND ART

Among present databases, there is a database including data to which a label suitably to be kept in secret exceptionally is attached because each piece of data within that database belongs to an individual. For example, non-patent literature 1 discloses a technology of pseudonymization of electronic health information. Moreover, non-patent literatures 2 and 3 disclose a technology which is an encryption technology for a pseudonymization and which is called a shuffling.

The technology disclosed in non-patent literature 1 will be explained with reference to FIG. 10. An authorizer of a pseudonymization system 100 which performs pseudonymization possesses a key 101, and the pseudonymization system 100 is prepared with an encryption function 102 in a common-key encryption scheme.

When a name 104 is given from a clinical system 103 to a pseudonymization system 100, the authorizer of the pseudonymization system 100 enters the name 104 to the encryption function 102. The encryption function 102 uses the key 101 possessed by the authorizer of the pseudonymization system 100 as a key for pseudonymization. An output by the encryption function 102 is a pseudonym 105 and is passed to a research system 106.

The technology disclosed in non-patent literature 2 will be explained in detail with reference to FIG. 11. According to this technology, plural ElGamal encrypted texts 201 are input to a mixing device 200. A number of the input encrypted texts is set to be Q. Q numbers of the encrypted texts form a sequence and are added with orders.

The mixing device 200 shuffles the orders of Q numbers of the encrypted texts at random, and each encrypted text is encrypted again and is output as a new ElGamal encrypted text 202. Re-encryption means to convert the ElGamal encrypted text into a different encrypted text with a decryption result remaining same by changing a random number used in the encryption.

The sequence of the ElGamal encrypted texts 201 including Q numbers of the input encrypted texts and the sequence of the ElGamal encrypted texts 202 including the Q numbers of the encrypted texts are in a mutually corresponding relationship. That is, the latter sequence corresponds to the former sequence having the orders of respective elements being shuffled and being encrypted. This correspondence relationship is known only by a device that is capable of decrypting the ElGamal encryption or the mixing device 200 which has shuffled the orders and has performed the re-encryption.

The mixing device 200 proves that there is a one-by-one correspondence relationship between n numbers of input encrypted texts and n numbers of output encrypted texts through a zero-knowledge proof 203 while hiding the correspondence relationship. When the technology disclosed in non-patent literature 2 is used, by providing a proof through the zero-knowledge proof, it becomes possible to (1) hide the correspondence relationship between input/output, and (2) sign the presence of valid correspondence relationship between input/output.

It is known that a system called a mix-net can be configured by preparing the plural numbers of mixing devices 200 explained above. The mix-net will be explained in detail with reference to FIG. 12. It is presumed that q is a prime number, G is a cyclic group that has a difficulty in a discrete logarithm problem, and the order thereof is the prime number q. It is also presumed that g is the generator of G. The mix-net 205 that is capable of examining an ElGamal encrypted text comprises H numbers of the mixing devices, and regarding each i from 1, . . . , to H, an i-th mixing device possesses a distributed secret key $x[i] \in Z/qZ$ in an encryption scheme that satisfies a condition $y[i]=g^{x[i]}$. $y[i]$ is opened to the public and y can be expressed as a following formula.

$$y = \prod_{i=1}^{H} y[i] \quad \text{[Equation 1]}$$

Generation of an ElGamal encrypted text with a condition $m \in G$ by a public key (g, y) is to select $r \in Z/qZ$ at random and to generate $(a, b)=(g^r, my^r)$.

When a sequence 204 including Q numbers of ElGamal encrypted texts is given to a first mixing device, an i-th device shuffles, from i=1 to H in order, the orders of the encrypted texts in the sequence passed from an i−1-th mixing device at random, re-encrypts individual encrypted texts independent from one another, and passes those encrypted texts to an i+1-th mixing device.

Moreover, the i-th mixing device performs zero knowledge proof that the encrypted texts in the sequence passed at the i+1-th time are merely the encrypted texts received from the i−1-th mixing device with shuffled orders of the encrypted texts and re-encrypted.

Each ElGamal text is encrypted by the public key (g, y). Re-encryption is, when, for example, an ElGamal encrypted text (a, b) is given, to covert such an encrypted text into $(ag^s, by^s)$ using a random $s \in Z/qZ$. The first mixing device uses the sequence of Q numbers of the ElGamal encrypted texts input to the mix-net. An H-th mixing device passes a sequence of encrypted texts generated locally to the next operation of the mix-net.

At the end, the mix-net decrypts the sequence of the encrypted texts passed from the H-th mixing device to plain texts 206 by H numbers of mixing devices cooperating together. This decryption is performed by the H numbers of the mixing devices which cooperatively decrypt respective encrypted texts. When, for example, an ElGamal encrypted text (a, b) is given, each i-th mixing device generates $a'[i]=a^{x[i]}$. The decryption result of (a, b) is $b/\pi a'[i]$. Each mixing device performs zero-knowledge proof that there is $x[i]$ which satisfies $a'[i]=a^{x[i]}$ and $y[i]=g^{x[i]}$.

When the two zero-knowledge proofs performed by individual mixing devices, i.e., the zero-knowledge proof for shuffling of the order and re-encryption and the zero-knowledge proof for decryption are collected, those become a zero-knowledge proof 207 that the mix-net shuffled the orders of the input encrypted texts as a whole and outputs decrypted encrypted texts.

The technology disclosed in non-patent literature 3 will be explained in detail with reference to FIG. 13. This technology realizes a "mix-net that is capable of examining a hybrid encrypted text". There are plural mixing devices according to the technology disclosed in non-patent literature 3 as well as the technology disclosed in non-patent literature 2. It is presumed that the number of the mixing device is H, numbers from 1 to H are assigned to individual mixing devices in order, and the mixing device to which a number is assigned is called an i-th mixing device.

A hybrid encrypted text 301 according to non-patent literature 3 can encrypt not an ElGamal encrypted text but a plain text having an arbitrary length unlike the encrypted text used in the technology disclosed in non-patent literature 2. Moreover, an encrypted text to be passed to the first mixing device is generated so as to be completely decrypted and become a plain text when partial decryption is performed thereon by Q times.

That is, it is presumed that q is a prime number, G is a cyclic group that has a difficulty in a discrete logarithm problem, and the order thereof is the prime number q. It is also presumed that g is the generator of G. The mix-net comprises H numbers of the mixing devices, and regarding each i from 1, ..., to H, the i-th mixing device possesses a distributed secret key $x[i] \in Z/qZ$ for an encryption scheme that satisfies $y[i]=g^{x[i]}$. $y[i]$ is opened to the public.

Next, how to generate an encrypted text will be explained. A hybrid encrypted text with m numbers of character strings is generated as follow. It is presumed that a system parameter g of an ElGamal encrypted text and a public key $(y[i] \in G)_{i=1,...,H}$ in the ElGamal encryption scheme are given. It is also presumed that senc and sdec are an encryption function and a decryption function, respectively, in the common-key encryption scheme, and K is a space of the key. It is also presumed that an m encryption relating to $\chi \in K$ is senc $(\chi, m)$ and the decryption thereof is sdec $(\chi, senc (\chi, n))=m$. It is also presumed that $\psi$ can be calculated through an one-by-one function from K to G, and can be calculated in a reverse manner.

First, $\chi[i] \in K$ and $r[i] \in Z/qZ$ which are selected at random regarding each i=1, ..., H are prepared. Next, $m[i-1]=(g^{r[i]}, \psi(\chi[i])y[i]^{r[i]}, senc (\chi[i], m[i]))$ is generated with $m[H]=m$ from i=H to 1 in a descending order, and m[0] is set as an encrypted text.

Next, a mix-net processing of a hybrid encryption will be explained in detail. A mix-net 300 that is capable of examining a hybrid encrypted text is a system including H numbers of the mixing devices that cooperatively work to execute a process as follow. When a sequence 301 including Q numbers of hybrid encrypted texts is given to the first mixing device, from i=1 to H in an order, each i-th mixing device shuffles the orders of the encrypted texts in the sequence passed from an i−1-th mixing device at random, partially decrypts individual encrypted texts to generate a set of Q numbers of the encrypted texts, and passes such a set to an i+1-th mixing device.

Moreover, the i-th mixing device performs zero-knowledge proof that the encrypted texts in the sequence passed at the i+1-th time are merely encrypted texts which are received from the i−1-th mixing device with shuffled order and partially decrypted. Q numbers of the encrypted texts are directly input to the first mixing device as well as the technology disclosed in non-patent literature 2. An H-th mixing device outputs a sequence of decrypted plain texts 302. The whole zero-knowledge proof is a validity proof 303 by the hybrid mix-net.

The hybrid encrypted text is encrypted by a public key (g, $(y[i])_{i=1,...,H}$). The partial decryption is, when, for example, $m[i-1]=(a[i], b[i], c[i])=(g^{r[i]}, \psi(\chi[i])y[i]^{r[i]}, senc (\chi[i], m[i]))$ is given to the i-th mixing device, to generate an output which is $\psi[i]=b[i]/a[i]^{x[i]}, m[i]=sdec (\psi[i], c[i])$.

PRIOR ART DOCUMENT

Non-patent Literature

Non-patent Literature 1: Alain Lemay, Jean-Marc Lina, Pseudonymization of Radiology Data for Research Purposes, Journal of Digital Imaging, Volume 20, Number 3, (2007), p. 284-295

Non-patent Literature 2: Jun Furukawa, Efficient and Verifiable Shuffling and Shuffle-Decryption, IEICE Transactions 88-A(1), (2005), p. 172-188

Non-patent Literature 3: Jun Furukawa, Kazue Sako, An Efficient Publicly Verifiable Mix-net for Long Inputs, IEICE Transactions 90-A(1), (2007), p. 113-127

DISCLOSURE OF INVENTION

Problem to be solved by the Invention

The technology disclosed in non-patent literature I performs pseudonymization by converting a name associated with electric health information on an individual using an encryption function of a common-key encryption, etc. However, because the key is used at the same time and at one location, when the key to be input to the encryption function is revealed, a real name can be known from the pseudonym. When the key is used at one location, a person who has an authority to operate that location at that time can easily obtain the key. Once the key is completely known by an authorizer, it is difficult to completely prevent that authorizer from leaking the key intentionally or accidentally.

On the other hand, a case in which the key is not used at one location and at the same time is the case in which the key is used at separate locations. That is, pieces of key data are distributed and possessed, the key cannot be decrypted unless the distributed pieces of key data are collected, a process using the key is performed by calculations individually using distributed pieces of key data, and when results of those processes are separately collected, the same result as that of the process using the single key is obtained. The distributed processes in this fashion are difficult through the encryption function of the common-key encryption.

Moreover, even if the key is not revealed, when there is a person who knows both real name and pseudonym generated by converting the real name, a correspondence relationship of the pseudonym with the real name comes to be known. That is, in the pseudonymization process, when there is a process of inputting a single real name and of outputting a single pseudonym, this process has a high possibility that the correspondence relationship is revealed.

Another problem of non-patent literature I is that the validity of a group electric health information of respective pieces of electric health information on individuals having undergone pseudonymization cannot be confirmed. It becomes possible to dissemble the effectiveness of a certain medicine when a group electric health information which does not correspond to the real electric information on individual is forged. In order to prevent this, it is necessary to confirm that group electric health information corresponding to the electric health information on individual is generated. However, the technology of non-patent literature 1 has a difficulty to perform such confirmation while hiding the electric health information on individual.

Although the technology of non-patent literature 1 relates to electric health information, the same type of technology can be applied to a database other than health information. Examples of such databases in which each data is associated with an individual are a criminal information database, an academic result database, and a black list database of a credit card. Moreover, a wide application target like a case in which each pieces of data are associated one another and the object of data is not an individual, such as data on a company name and data on a product, can be expected. In any cases, these databases have the foregoing problem.

The technology of non-patent literature 2 is a technology which makes a correspondence relationship between the sequence of input encrypted texts and the sequence of output encrypted texts unknown. According to the mix-net using this technology and the technology of non-patent literature 3, unless the authorizers of all mixing devices collude one another, the correspondence relationship between an input and a final output is unknown to anyone.

However, when this scheme is applied to the database of electric health information, etc., it is difficult to ensure the validity of electric health information on an individual to be input. When, for example, certain electric health information is input, it is necessary to clarify that to whom that electric health information belongs.

This is because correct group electric information is not generated even if electric health information on a pseudo person is collected. The electric health information itself can be hidden until becoming a part of the group electric health information by encryption. However, a medical institution or the like needs to ensure that this information is made correctly. When the medical institution puts a signature on this data, this brings about a problem that it becomes apparent who took a medical treatment at a medical institute and which medical institute that person took the medical treatment.

The present invention has been made in view of the forgoing problems, and it is an object of the present invention to provide a data reference system which makes it possible for the generator of each piece of data to prove that the data is valid, can prove that a database is constructed with that data proven as valid, and can be effectively refer thereto. It is another object of the present invention to provide a data reference method for referring such a database and a database presentation/distribution system which can distribute and present that database.

Means for Solving the Problem

The present invention provides a data reference system that comprises: an element-data generating device that generates element data; a database generating system that collects plural pieces of element data in order to generate a database; and a database presentation system that outputs data to be referred from the database, wherein the element-data generating device encrypts vectors each including plural pieces of data in order to generate a vector including encrypted texts, and outputs the generated vector as the element data, the database generating system includes a plurality of first distributed devices and outputs a sequence of all pieces of element data as the database, and the database presentation system includes a plurality of second distributed devices, generates, based on a reference item that specifies an item to be referred a plurality of data sequences, the data being to be referred from the database, and performs order shuffling of each element on the sequences of data by all second distributed devices, wherein the shuffled orders of elements in a data sequence are consistent throughout all data sequences.

Moreover, the present invention provides a database presentation/distribution system that comprises a plurality of database presentation devices, wherein the database presentation device includes communication means which communicates with another database presentation device, a database, a reference item, a distributed secret key for encryption, a method of shuffling an order, and a public key of the another database presentation device are input to the database presentation system, the database presentation device includes exponentiation means which generates a plurality of sequences of encrypted texts to be referred from the database based on the reference item, converts some of encrypted texts in a sequence into an encrypted texts obtained by raising all encrypted texts to a same power and having a consistent decryption result through a communication with another database presentation device, and the database presentation device configures a mix-net in solo or with another database presentation device by exchanging a sequence of encrypted texts having undergone an exponentiation process by the exponentiation means, and a sequence of reference data in other encrypted texts with another database presentation device, and outputs a sequence of encrypted texts by shuffling orders of all encrypted texts in a sequence with the same orders.

Furthermore, the present invention provides a data reference method that comprises: encrypting the vector including plural pieces of data by an element-data generating device generating a vector including encrypted texts and outputs the generated vector as element data, and outputting a sequence of all pieces of element data as a database through a database generating system having a plurality of first distributed devices, wherein a database presentation system including a plurality of second distributed devices which generates, based on a reference item that specifies an item to be referred, a plurality of data sequences, the data being to be referred from the database, and the second distributed device performs order shuffling of each element on the sequence of data, and the shuffling order of the elements in a data sequence is consistent throughout all data sequences.

Effect of the Invention

The database reference system of the present invention is a system which construct a database by collecting pieces of data and which refers some of data for analyzing the database, distributes an identifier given to data and performs pseudonymization on the identifier, and makes a correspondence relationship between this data having undergone pseudonymization and original data in a referring process. This enables the generator of each piece of data to prove that the data is valid, to prove that the database is constructed with the data proven as valid, and to appropriately refer to that database. Moreover, the data reference method and the database presentation/distribution system can appropriately handle the database provided by the database reference system.

The forgoing and other objects, features, and advantages of the present invention will be apparent from a following explanation with reference to the accompanying drawings.

BEST MODE FOR CARRYING OUT THE INVENTION

Figure 1:
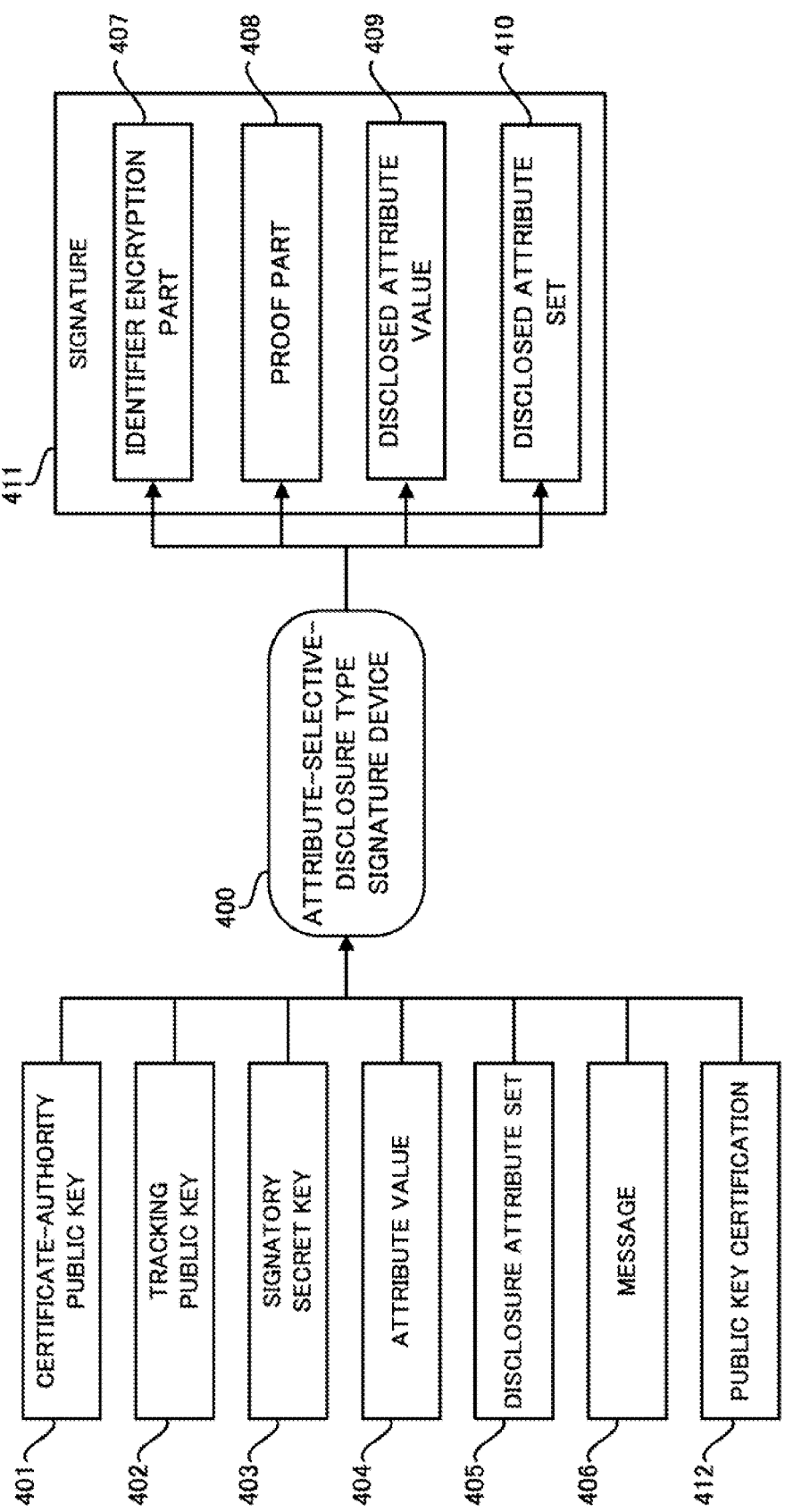
FIG. 1 is an explanatory diagram showing an attribute-selective-disclosure type signature device according to an embodiment of the present invention.

A data reference system of the present invention with minimum structural elements comprises: an element-data generating device that generates element data; a database generating system that collects plural pieces of element data in order to generate a database; and a database presentation system that outputs data to be referred from the database, wherein the element-data generating device encrypts vectors each including plural pieces of data in order to generate a vector including encrypted texts, and outputs the generated vector as the element data, the database generating system includes a plurality of first distributed devices and outputs a sequence of all pieces of element data as the database, and the database presentation system includes a plurality of second distributed devices, generates, based on a reference item that specifies an item to be referred a plurality of data sequences, the data being to be referred from the database, and performs order shuffling of each element on the sequences of data by all second distributed devices, wherein the shuffled orders of elements in a data sequence are consistent throughout all data sequences.

Moreover, a database presentation/distribution system of the present invention with minimum structural elements comprises a plurality of database presentation devices, wherein the database presentation device includes communication means which communicates with another database presentation device, a database, a reference item, a distributed secret key for encryption, a method of shuffling an order, and a public key of the another database presentation device are input to the database presentation system, the database presentation device includes exponentiation means which generates a plurality of sequences of encrypted texts to be referred from the database based on the reference item, converts some of encrypted texts in a sequence into an encrypted texts obtained by raising all encrypted texts to a same power and having a consistent decryption result through a communication with another database presentation device, and the database presentation device configures a mix-net in solo or with another database presentation device by exchanging a sequence of encrypted texts having undergone an exponentiation process by the exponentiation means, and a sequence of reference data in other encrypted texts with another database presentation device, and outputs a sequence of encrypted texts by shuffling orders of all encrypted texts in a sequence with the same orders.

Furthermore, a data reference method of the present invention with minimum structural elements comprises: encrypting the vector including plural pieces of data by an element-data generating device; generating a vector including encrypted texts and outputs the generated vector as element data; and outputting a sequence of all pieces of element data as a database through a database generating system having a plurality of first distributed devices, wherein a database presentation system including a plurality of second distributed devices which generates, based on a reference item that specifies an item to be referred, a plurality of data sequences, the data being to be referred from the database, and the second distributed device performs order shuffling of each element on the sequence of data, and the shuffling order of the elements in a data sequence is consistent throughout all data sequences.

The database reference system with the above-explained configuration is a system which collects pieces of data in order to construct a database, and which refers to some data in order to analyze the database. An identifier associated with data in the referring step is distributed and subjected to pseudonymization, and the correspondence between the data having undergone pseudonymization and original data is made unknown. Accordingly, the generator of each data can verify that data is valid and the database is generated from the verified data, and the database can be referred efficiently. Moreover, the data reference method and the database presentation/distribution system of the present invention can handle the database provided from the database reference system.

An embodiment of the present invention will be explained with reference to the accompanying drawings. First, an explanation will be given in detail of a method of performing zero-knowledge proof for a change in the form of a hybrid encryption and for a correct decryption.

When an electronic signature is used, in general, a signatory generates a signature using a secret key in a document and attaches the generated signature. To a public key corresponding to the secret key, a public key certification is issued by a certificate authority.

The public key certification includes the signature of the certificate authority for the public key of the signatory and for the attribute, etc., of the signatory. An examining process of examining the signature of the signatory to a document includes processes of (1) examining the signature by the public key; (2) confirming the signatory by checking the contents of the public key certification; and (3) examining the signature of the certificate authority added to the public key certification.

In the forgoing examining process for the signature, it is necessary to show the public key certification to a verifier when the signature is examined, so that all attributes of the signatory described in the public key certification become known to the verifier. There are many cases in which it is not necessary to let all attributes of the signatory to be apparent in order to prove the validity of the document, and such a whole disclosure of the public key certification may result in leaking of private information.

According to a signature method of the present embodiment, a signatory can sign while selecting an attribute in the public key certification to be disclosed when generating a signature, and the facts other than the fact that the signatory generated a signature using a secret key corresponding to the public key certification having an attribute that is disclosed when the signature was made is kept in secret from the signature. Such a signature is referred to as an attribute-selective-disclosure type signature.

A "signature system" according to the embodiment will be explained in detail with reference to FIG. 1. First, an explanation will be given of a certificate-authority public key 401, a certificate-authority secret key, tracking information, a tracking secret key, and a tracking public key 402 of the certificate authority in an attribute-selective-disclosure type signature scheme.

It is presumed that q is a prime number. G1, G2, and G are the groups of an order q, and there is a bilinear map e from G1×G1 to G2. It is also presumed that $g_1$, $g_2$, and g are the generators of G1, G2, and G. Furthermore, it is presumed that G has a difficulty in a discrete logarithm problem.

It is presumed that $Hash_q$ is a hush function that maps an arbitrary character string on a field (Z/qZ), and a natural number N is the number of items of a public key certification 412.

It is presumed that h, h[1], . . . , h[N], f are elements of G1 selected at random. Each h[i] of (h[1], . . . , h[n]) is associated with an i-th attribute.

It is presumed that γ is an element of the field Z/qZ selected at random, and $Y=g_2\gamma$ is satisfied. Moreover, it is presumed that s is a point on the field Z/qZ selected at random, and $T=g^s$ is satisfied.

It is presumed that the certificate-authority secret key is y. It is also presumed that the certificate-authority public key 401 is q, G1, G2, G, e, the description of the hush function $Hash_q$, $g_1$, $g_2$, g, N, h[0], h[1], . . . , h[N], f, and Y. Moreover, it is presumed that the tracking secret key is s. Furthermore, it is presumed that the tracking public key 402 is T.

The public key certification 412 issued by the certificate authority, a signatory secret key 403 corresponding to that public key certification, and an attribute value 404 will be explained. A∈G1, b, a, a[1], . . . , a[n], and z∈Z/qZ which satisfy a following relationship are generated in cooperation with a person to whom the public key is issued.

$$e(A, yg_2^a) \cdot e\left(h[0]^z \prod_{i=1}^{N} h[i]^{a[i]}, g_2\right) \cdot e(f^b, g_2) = \quad \text{[Equation 2]}$$

$$e(g_1, g_2) \quad B = g^z$$

It is presumed that the public key certification 412 is (A, a, and b), tracking information is B, the attribute value 404 is (a[1], a[n]), and the signatory secret key 403 is (z).

A signature 411 which relates to m that is a message 406 and which discloses only an attribute value belonging to a disclosure attribute 405 that is O ⊂ [1, . . . , N] is generated by an attribute-selective-disclosure type signature device 400 as follow.

The attribute-selective-disclosure type signature device selects t∈Z/qZ at random and generates enc (z)=($g^t$, $g^z T^t$). $(a[i])_{i \in O}$, enc(z), t that satisfies the following formula, $(a[i])_{i \in [1, \ldots, N] \backslash O}$, A, z, b, a non-interactive zero-knowledge proof prf for b, O that is a disclosed attribute set 410, and $(a[i])_{i \in O}$ that is a disclosed attribute value 409 are taken as the signature.

$$(g^t, g^Z T^t) \quad \text{[Equation 3]}$$

$$e(A, Yg_2^a) \cdot e\left(h[0]^Z \prod_{i \in [1, \ldots, N] \backslash o} h[i]^{a[i]}, g_2\right) \cdot e(f^b, g_2) =$$

$$e(g_1, g_2) e\left(\prod_{i \in O} h[i]^{-o[i]}, g_2\right)$$

However, when a hush value is calculated in a non-interactive zero-knowledge proof, m is assigned to an argument. enc (z) is called an identifier encryption part 407 and a non-interactive zero-knowledge proof prf is called a proof part 408, and the examination of the signature is made by checking the validity of prf.

Figure 2:
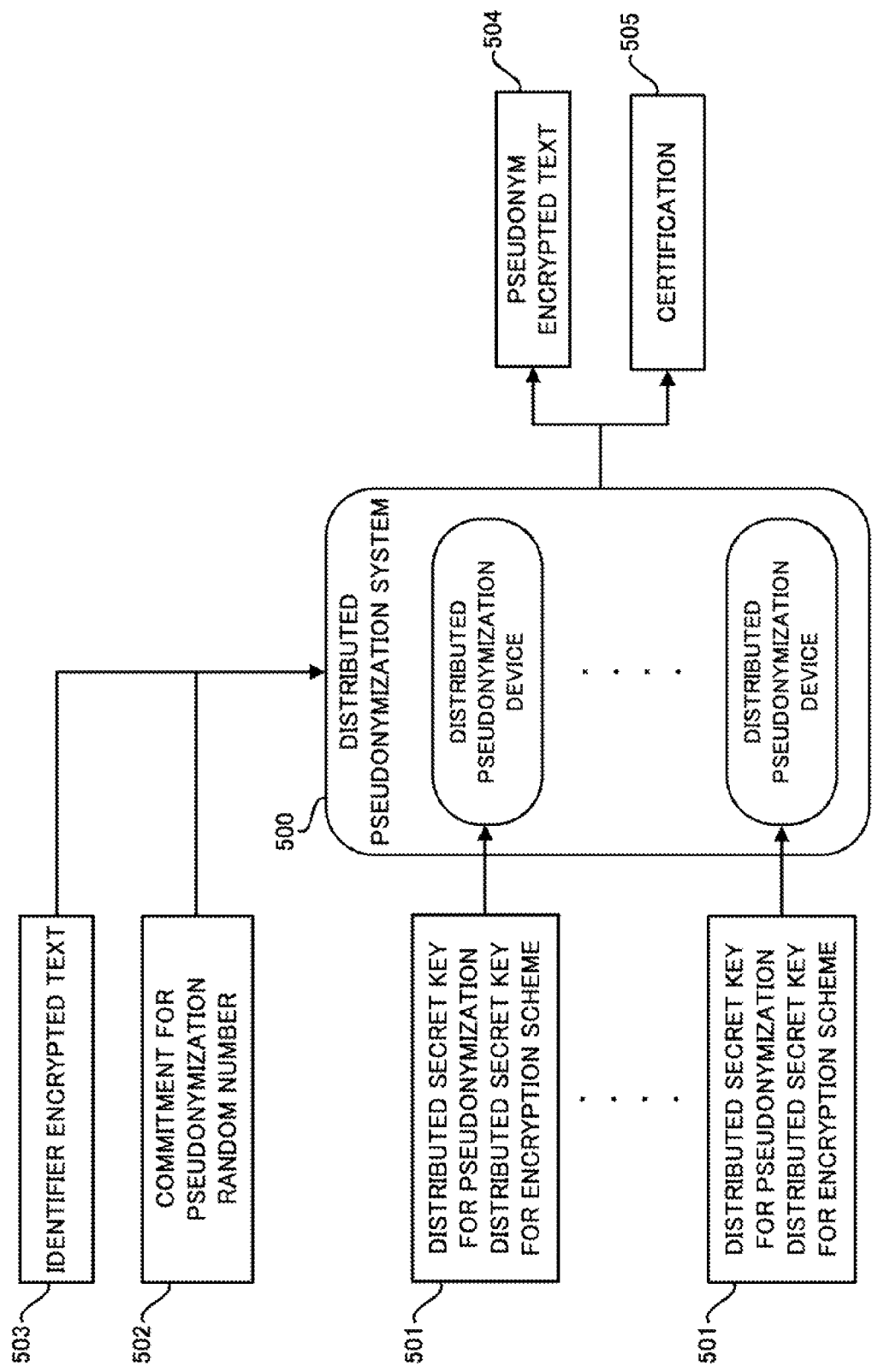
FIG. 2 is an explanatory diagram showing a distribution pseudonymization system according to the embodiment of the present invention.

Next, a "distributed pseudonymization system for an identifier in an encrypted text" which converts the encrypted text of a name into the encrypted text of a pseudonym will be explained in detail with reference to FIG. 2. It is presumed that q is a prime number, G is a cyclic group that has a difficulty in a discrete logarithm problem, the order thereof is the prime number q, and g and h are the generators of G.

A distributed pseudonymization system 500 for an identifier in an encrypted text comprises plural distributed pseudonymization devices. In this embodiment, there are H numbers of the distributed pseudonymization devices, and regarding each i from 1, . . . , to H, an i-th distributed pseudonymization device possesses a distributed secret key x[i]∈Z/qZ in an encryption scheme that satisfies the condition y[i] $=g^{x[i]}$. y[i] is opened to the public and y is expressed as a following formula.

$$y = \prod_{i=1}^{H} y[i] \quad \text{[Equation 4]}$$

It is presumed that senc and sdec are the encryption function and a decryption function, respectively, in the common-key encryption scheme, and K is the space of the key. It is also presumed that the m encryption relating to χ∈K is senc(χ, m) and the decryption thereof is sdec(χ, senc (χ, n))=m. ψ can be calculated through the one-by-one function from K to G, and can be calculate in a reverse manner, and the space of the identifier is Z/qZ.

The distributed pseudonymization device first performs an initialization setting. Regarding each i from 1, . . . , to H, the i-th distributed pseudonymization device generates distributed secrets σ[i] and τ[i]∈Z/qZ for a pseudonymization at random, and further generates w[i]=$g^{\sigma[i]} h^{\tau[i]}$. The distributed pseudonymization system 500 discloses was a commitment 502 of a pseudonymization random number under the following conditions.

$$w = \prod_{i=1}^{H} w[i] \quad \text{[Equation 5]}$$

$$\sigma = \prod_{i=1}^{H} \sigma[i]$$

$$\tau = \sum_{i=1}^{H} \tau[i]$$

Next, a method of generating an encrypted text 503 of an identifier u∈Z/qZ will be explained. χ[i]∈K and r[i]∈Z/qZ which are selected at random regarding each i from 1, ..., to H are prepared, and r∈Z/qZ is selected at random. u[i] and v[i]∈Z/qZ which are selected at random regarding each i from 1, ..., to H, so as to satisfy the following formula are prepared.

$$\sum_{i=1}^{H} u[i] = u \sum_{i=1}^{H} v[i] = v \quad \text{[Equation 6]}$$

Regarding each i from 1, ..., to H, $c[i]=(g^{u[i]}h^{v[i]}, g^{r[i]}, \psi(\chi[i])y[i]^{r[i]}, senc(\chi[i], u[i], v[i]))$ is generated, and $c=(g^u h^v)$ is generated. (c, c[1], c[2], ..., c[H]) is the encrypted text of an identifier u. Next, a distributed pseudonymization method for an identifier in an encrypted text will be explained.

Data on a key 501 including distributed secret keys σ[i] and τ[i] for pseudonymization and a distributed secret key x[i] for the encryption scheme are input to each i-th distributed pseudonymization device. The identifier encrypted text 503 (c, c[1], c[2], ..., c[H]) is input to the distributed pseudonymization system 500. It is presumed that c[i]=(c[i1], c[i2], c[i3], c[i4]).

All distributed pseudonymization devices perform a following confirmation.

$$c = \prod_{i=1}^{H} c[i] \quad \text{[Equation 7]}$$

The i-th distributed pseudonymization device generates a following.

$$c[i5] = \frac{c[i3]}{c[i2]^{x[i]}} \quad \text{[Equation 8]}$$

$$x'[i] = \phi^{-1}(c[i5])$$

$$(u'[i], v'[i]) = sdec(x'[i], c[i4])$$

The i-th distributed pseudonymization device confirms $c[i1]=g^{u'[i]}h^{v'[i]}$. All distributed pseudonymization devices communicate one another to perform a multi-party calculation. Moreover, τ'[i]∈Z/qZ is selected at random at each i time, and $z[i]=(z[i1], z[i2])=(g^{\tau'[i]}, g\rho[i]y^{\tau'[i]})$ is generated. Each i-th distributed device obtains ρ[i] that satisfies following conditions.

$$\sum_{i=1}^{H} \rho[i] = \frac{1}{u+\sigma} \quad \text{[Equation 9]}$$

$$\rho = \sum_{i=1}^{H} \rho[i] \quad \text{[Equation 10]}$$

$$\tau' = \sum_{i=1}^{H} \tau'[i]$$

$$z = \left(\prod_{i=1}^{H} z[i1], \prod_{i=1}^{H} z[i2]\right) = (g^{\tau'}, g^\rho y^{\tau'})$$

All distributed pseudonymization devices respectively perform zero-knowledge proof for the validity of their own local calculation, so that it is verified that z is the ElGamal encrypted text of $g^{1/(u+\sigma)}$. According to the distributed pseudonymization system of the present embodiment, $g^{1/(u+\sigma)}$ is the pseudonym of u by a random number σ. An encrypted text 504 of the obtained pseudonym that is z and a certification 505 are output.

In the forgoing explanation, the scheme of converting the encrypted text of the identifier to the encrypted text of a corresponding pseudonym is explained, but it is also possible to generate the encrypted text of the corresponding pseudonym from the identifier itself. This is apparent because everyone can encrypt the identifier as long as there is an identifier.

Meantime, the problem such that a medical institute is specified from the signature of a medical institute can be solved by using the forgoing technology of the "signature system". It is appropriate if a signature is generated by disclosing only an attribute for the medical institute being received a certain approbation, for example. However, according to this operation only, there remains a problem that information on the medical institute is not left in generated group electric health information, and thus an analysis using the information on the medical institute is unable. Regarding another problem, it is useful if the group electric health information can be analyzed using kinship information, but there is no means for performing such analysis.

Moreover, when the technology of the "distributed pseudonymization system for an identifier in an encrypted text" is used, there remains a problem such that a correspondence relationship is revealed when there is a process of inputting a single real name and of outputting a single pseudonym. Hence, an explanation will be given of a system which distributes an identifier given to data and performs pseudonymization thereon, makes a correspondence relationship between the data having undergone pseudonymization and original data unknown in a referring process, is capable of proving that the generator of each data is valid, is also capable of proving that database is generated from the data proven as valid, and is further capable of referring to that database efficiently.

Figure 3:
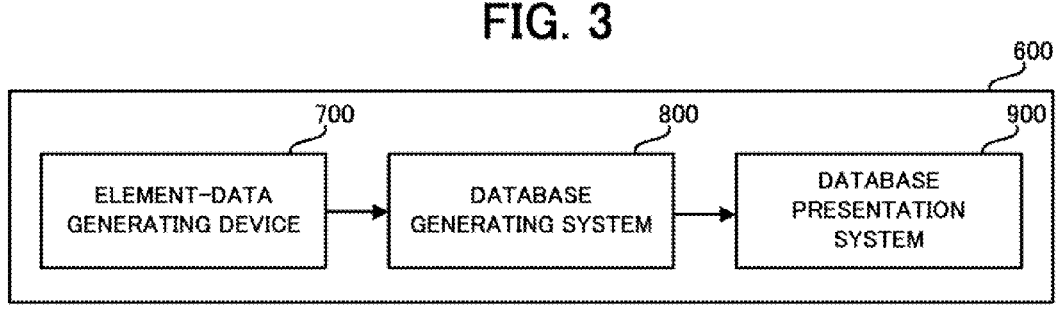
FIG. 3 is a diagram showing a configuration of a data referring system according to the embodiment of the present invention.

FIG. 3 is a diagram showing the configuration of the data referring system according to the embodiment of the present invention. A data referring system 600 comprises an element-data generating device 700, a database generating system 800, and a database presentation system 900.

The element-data generating device 700 generate each piece of data, and the database generating system 800 collects multiple pieces of data generated by the element-data generating device 700 and generates a database. The database presentation system 900 collects requisite data from the database and presents the collection of the data.

Figure 4:
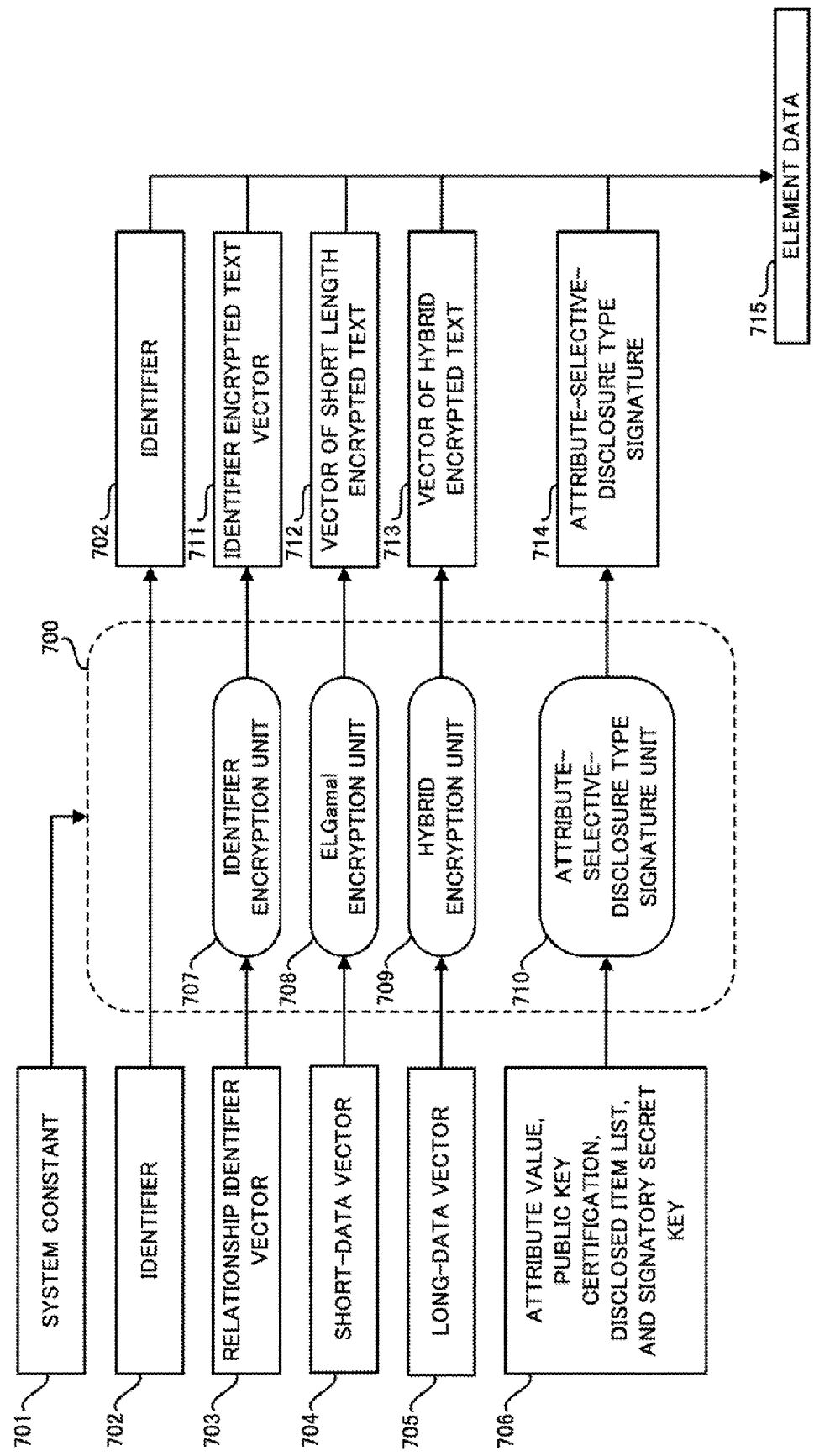
FIG. 4 is an explanatory diagram showing an element-data generating device according to the embodiment of the present invention.

FIG. 4 is a diagram showing a configuration of the element-data generating device according to the embodiment of the present invention. The element-data generating device 700 comprises an identifier encryption unit 707, an ElGamal encryption unit 708, a hybrid encryption unit 709, and an attribute-selective-disclosure type signature unit 710. These individual units are configured by one or plural computer programs.

Moreover, input to the element-data generating device 700 are a system constant 701, an identifier 702 (u), a relationship identifier vector 703 (V=(v[1], ..., v[N$_v$])), a short-data vector 704 (d[1], ..., d[N$_d$]), a long-data vector 705 (m[1], ..., m[N$_m$]), a public key certification (A, a, b) that is data 706 for an attribute-selective-disclosure signature, an attribute value a[1], ..., a[$N_a$], a disclosed item list 0 ⊂ [1, ..., $N_a$], and a signatory secret key z.

The system constant 701 includes following pieces of data:

Descriptions of prime number q and group G (where G is a cyclic group that has a difficulty in a discrete logarithm problem and the order thereof is the prime number q);

Constant g in ElGamal encryption scheme (where g is the generator of G);

IDS=Z/qZ at an identifier space;

Number H of distributed devices;

Public key y[1], ..., y[H]∈G in distributed ELGamal encryption scheme;

[Equation 11]

$$\prod_{i=1}^{H} y[i] = y;$$

Number $N_v$ of relationship identifiers;

Function φ (IDS→G, one-by-one function, and calculation is possible in a reverse manner);

Key space K, plain text space M, encrypted text space C, encryption function senc (K×M→C), and decryption function sdec (K×C→M) in common-key encryption scheme;

Function ψ(K→G, one-by-one function, and calculation is possible in a reverse manner);

Numbers $N_d$, $N_m$ of data (where $N_d$ is the number of short data, and each piece of short information is the element of G. $N_m$ is the number of long data, and each piece of the long data is an arbitrary character string. d[1], ..., d[$N_d$] is the vector of short data, and m[1], ..., m[$N_m$] is the vector of long data);

Public key (q, G1, G2, G, e, description of hush function Hash$_q$, $g_1$, $g_2$, g, N, h[0], h[1], ..., h[N], f, and Y) and tracking public key T of certificate authority in attribute-selective-disclosure type signature; and Commitment w of random number in distributed pseudonymization for identifier of encrypted text.

Note that duplicated symbols G, q, and g, etc. stand for the same.

Figure 5:
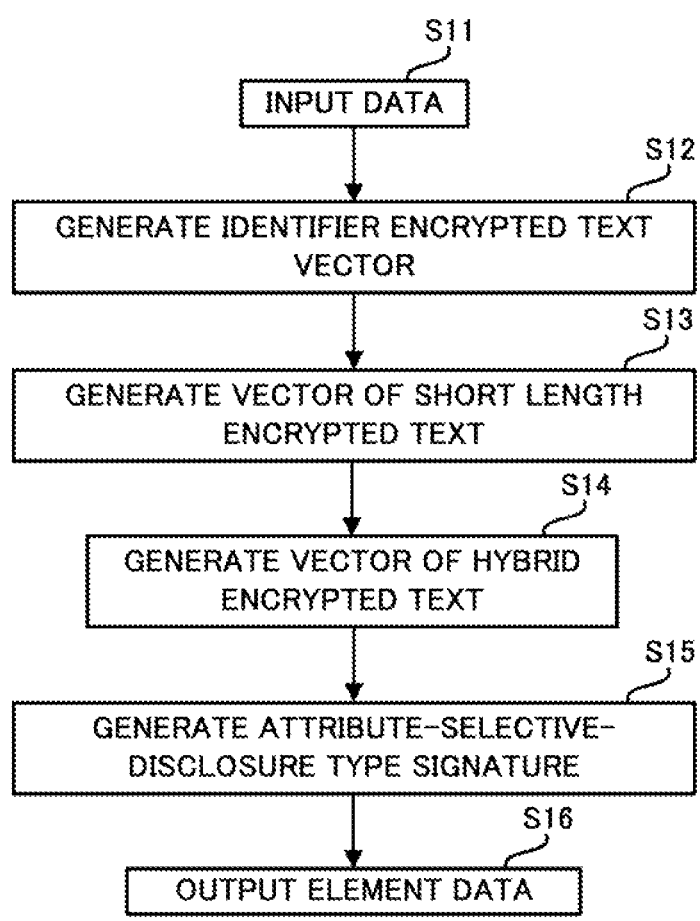
FIG. 5 is a flowchart of the element-data generating device.

Next, the process by the element-data generating device 700 will be explained in detail with reference to the flowchart of FIG. 5.

When pieces of data which are the system constant 701, the identifier 702, the relationship identifier vector 703, the short-data vector 704, the long-data vector 705, and the data 706 for the attribute-selective-disclosure signature are input (step S11), the identifier encryption unit 707 generates an identifier encrypted text vector 711 that is an encrypted text of each element of the relationship identifier vector v[1], ..., v[$N_v$]) using the above-explained method of the "distributed pseudonymization system for an identifier in an encrypted text" of the embodiment (step S12). At this time, individual identifier encrypted text vectors 711 are set to be ev[1], ..., ev[$N_v$].

Next, the ElGamal encryption unit 708 generates a vector 712 of short encrypted texts each of which is an ElGamal encrypted text using (g, y) as the public key in the ElGamal encryption scheme from vectors of short data d[1], ..., d[$N_v$] (step S13). At this time, the vector 712 of each short encrypted text is set as ed[1], ..., ed[$N_d$].

Next, a hybrid encryption unit 709 generates a vector 713 of hybrid encrypted text using (g, y[i]$_{i=1,...,H}$) as a the public key in the scheme disclosed in the non-patent literature 3 from long data vectors m[1], ..., m[$N_m$]. At this time, the vector 713 of each hybrid encrypted text is set as em[1], ..., em[$N_m$] (step S14).

The attribute-selective-disclosure type signature unit 710 generates an attribute-selective-disclosure type signature 714 that is sig=(enc (z), prf, 0, (a[i])∈$_0$) relative to (u, ev[1], ..., ev[$N_v$], ed[1], ..., ed[$N_d$], em[1], ..., em[$N_m$]) using the above-explained scheme of the "signature system" of the embodiment (step S15) where enc(z) is an identifier encrypted part, prf is a proof part, and an attribute value to be opened to the public is set to be 0.

Element data 715 including following pieces of data generated through the forgoing steps: (u, ev[1], ..., ev[$N_v$], ed[1], ..., ed[$N_d$], em[1], ..., em[$N_m$], (enc (z), prf, 0, (a[i])$_i$∈$_o$) is output (step S16).

Figure 6:
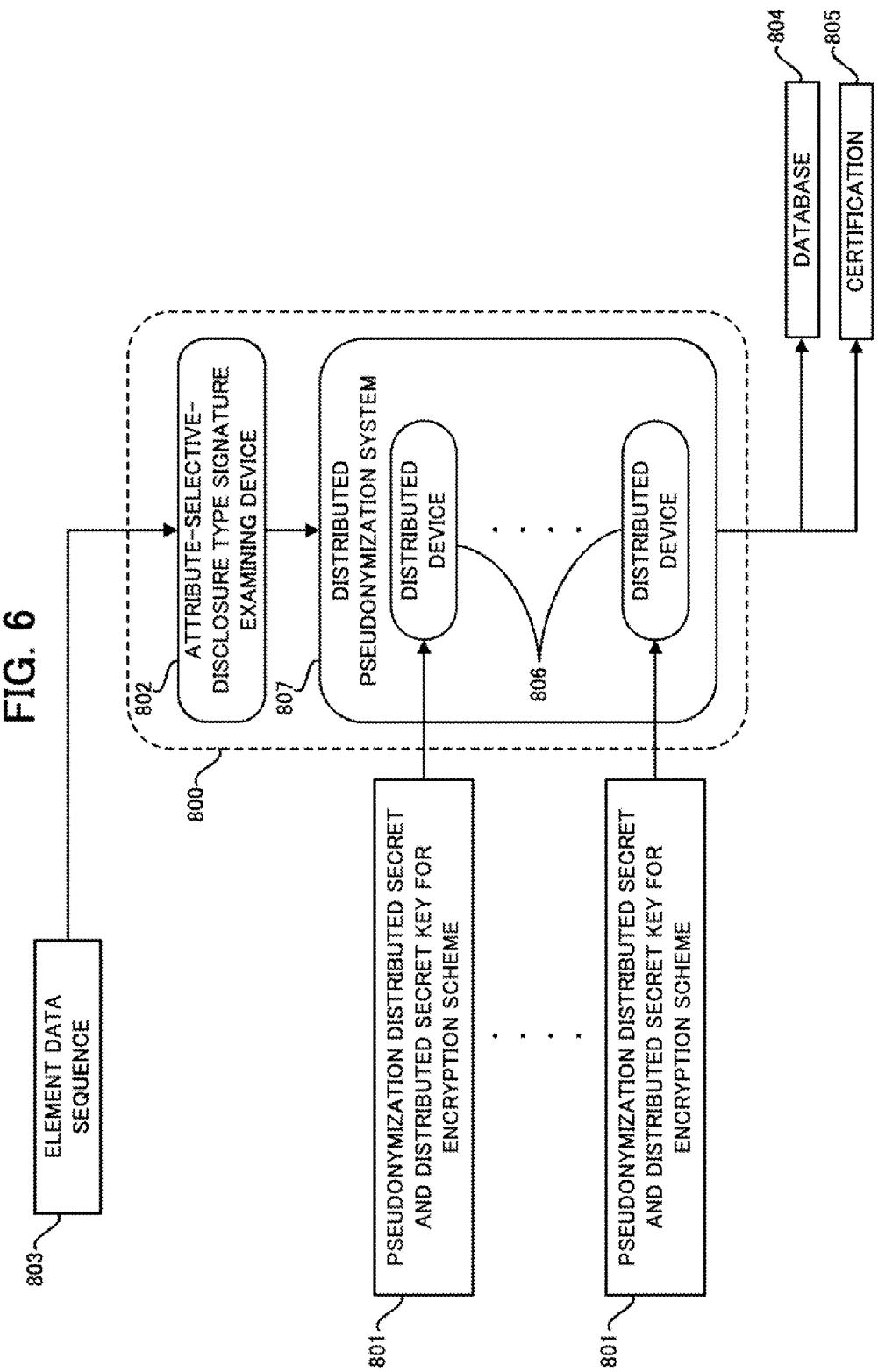
FIG. 6 is an explanatory diagram showing a database generating system according to the embodiment of the present invention.

Next, a database generating system according to the embodiment of the present invention will be explained in detail with reference to FIG. 6. The database generating system 800 comprises a distributed pseudonymization system 807 including H numbers of distributed devices 806 and an attribute-selective-disclosure type signature examining device 802, and a system constant, data 801 including pseudonymization distributed secrets σ[i], τ[i] and a distributed secret key x[i] for an encryption scheme, a set of attribute values 0' ⊂ [1, ..., N], and a sequence 803 of plural pieces of element data 715 are input to each i-th distributed device.

Figure 7:
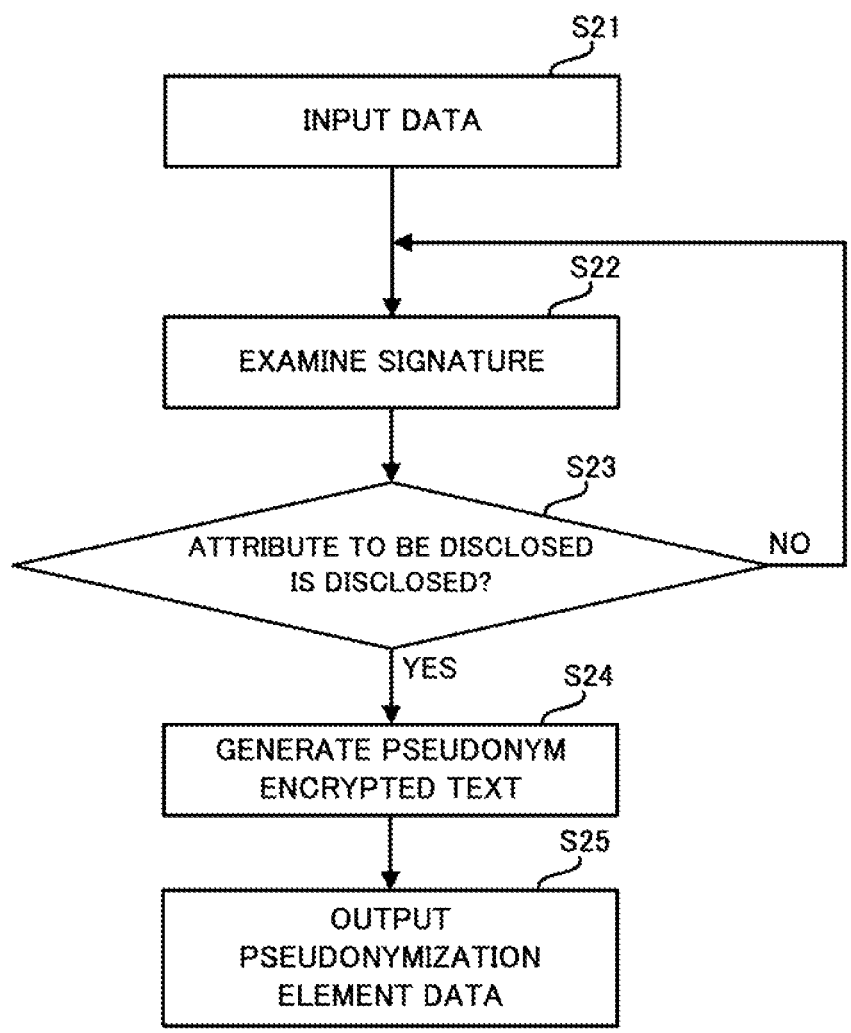
FIG. 7 is a flowchart of the database generating system.

Next, the process by the database generating system 800 will be explained in detail with reference to the flowchart shown in FIG. 7.

When the forgoing pieces of data are input (step S21), the attribute-selective-disclosure type signature examining device 802 examines the attribute-selective-disclosure type signature regarding each element data (step S22), and further examines that 0' ⊂ 0 is satisfied and an attribute intended to be disclosed are actually disclosed (step S23).

When the attribute intended to be disclosed is actually disclosed, the distributed pseudonymization system 807 generates respective encrypted texts of pseudonym through the method of the "distributed pseudonymization system for an identifier in an encrypted text" using the identifier u and the identifier encrypted text vectors ev[1], ev[$N_v$] (step S24). At this time, respective encrypted texts of pseudonym are set to be epu, epv[1], epv[$N_v$] where each i-th distributed device serves as an i-th distributed pseudonymization device.

A sequence of pseudonymization element data (epu, epv [1], ..., epv[$N_v$], ed[1], ..., ed[$N_d$], em[1], ..., em[$N_m$], (enc (z), prf, 0, and (a[i])$_i$∈$_0$)) obtained through all distributed devices is output as a database 804 (step S25). The certification of the called distributed pseudonymization system becomes a certification 805 of the validity of database generation.

Figure 8:
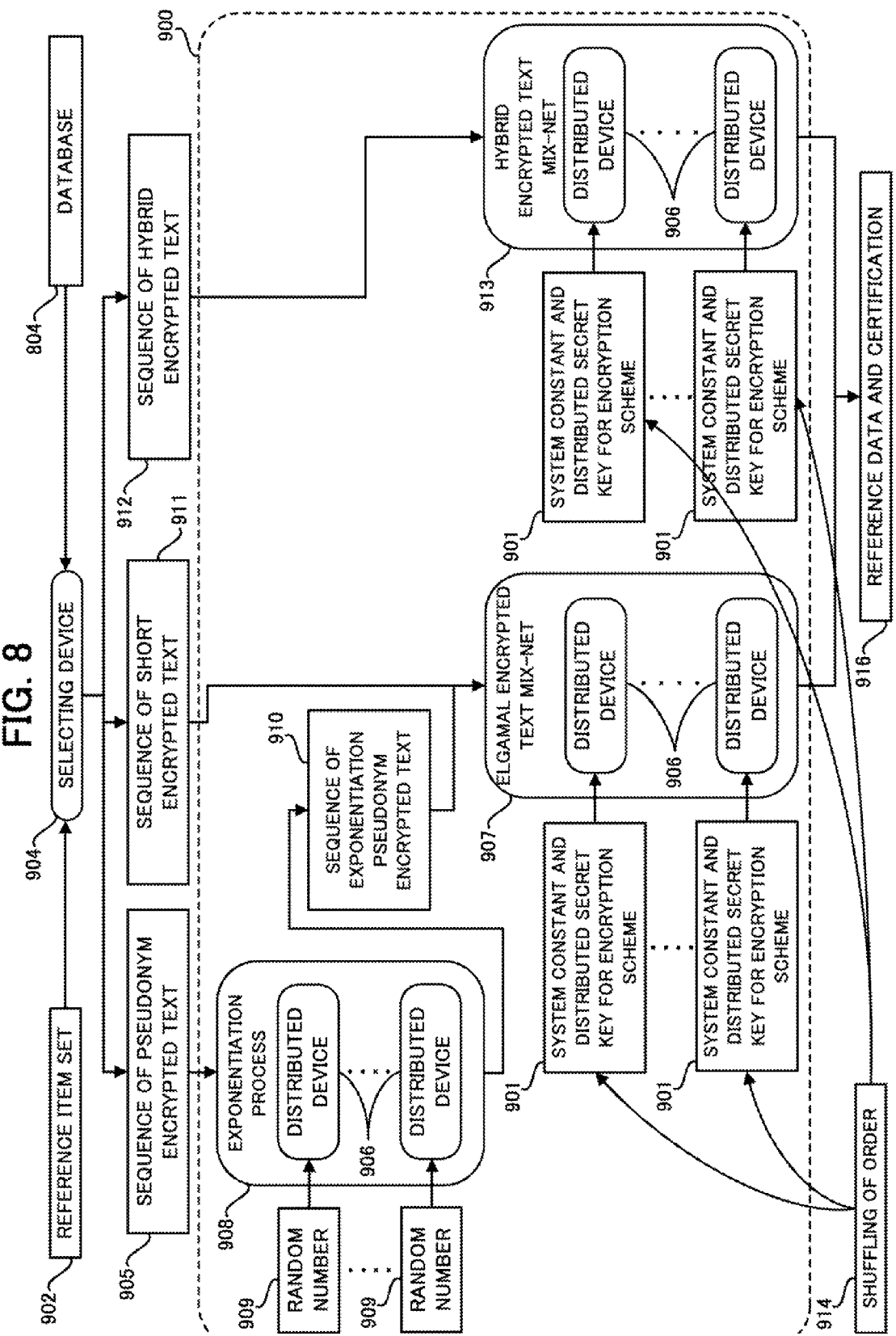
FIG. 8 is an explanatory diagram showing a database presentation system according to the embodiment of the present invention.

Next, the database presentation system of the embodiment of the present invention will be explained in detail with reference to FIG. 8. The database generating system 900 comprises H numbers of distributed devices 906. Each distributed device is realized by one or plural programs.

Input to each i-th distributed device are data 901 including the system constant and the distributed secret key x[i] for an encryption scheme, a reference-data item set 902, and a database 804. The reference-data item set 902 specifies an item to be referred among an identifier, a relationship identifier, a short-data item, a long-data item, and data on a signatory. The number of pieces of data to be referred may be a multiple number.

Figure 9:
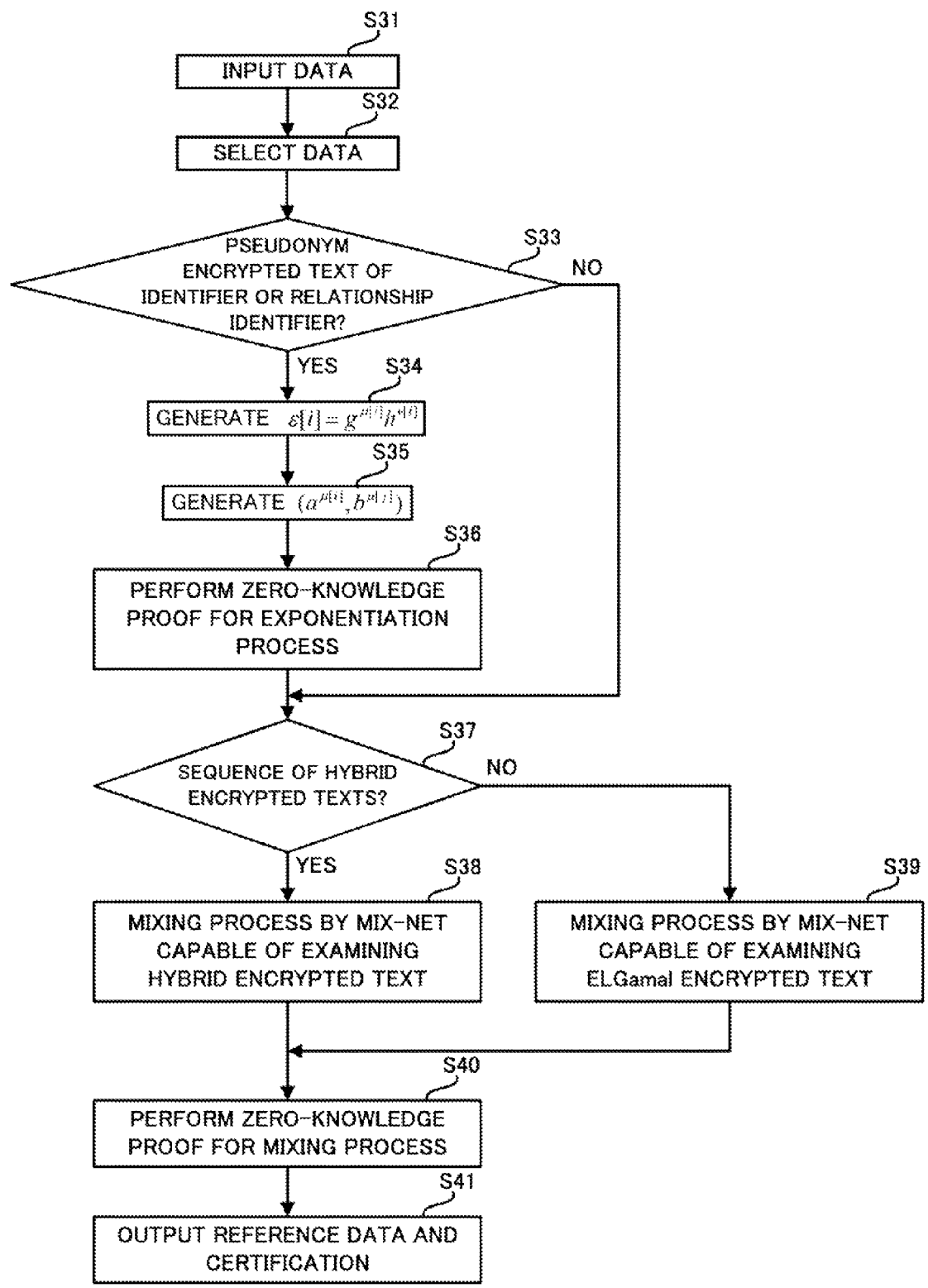
FIG. 9 is a flowchart of the database presentation system.
Figure 10:
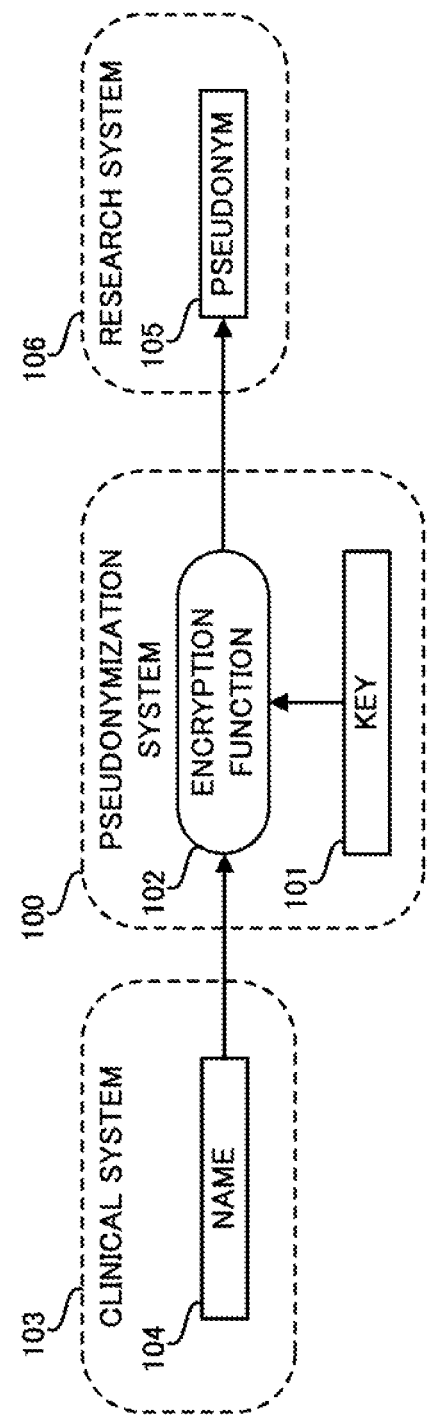
FIG. 10 is a block diagram showing a system disclosed in non-patent literature 1.
Figure 11:
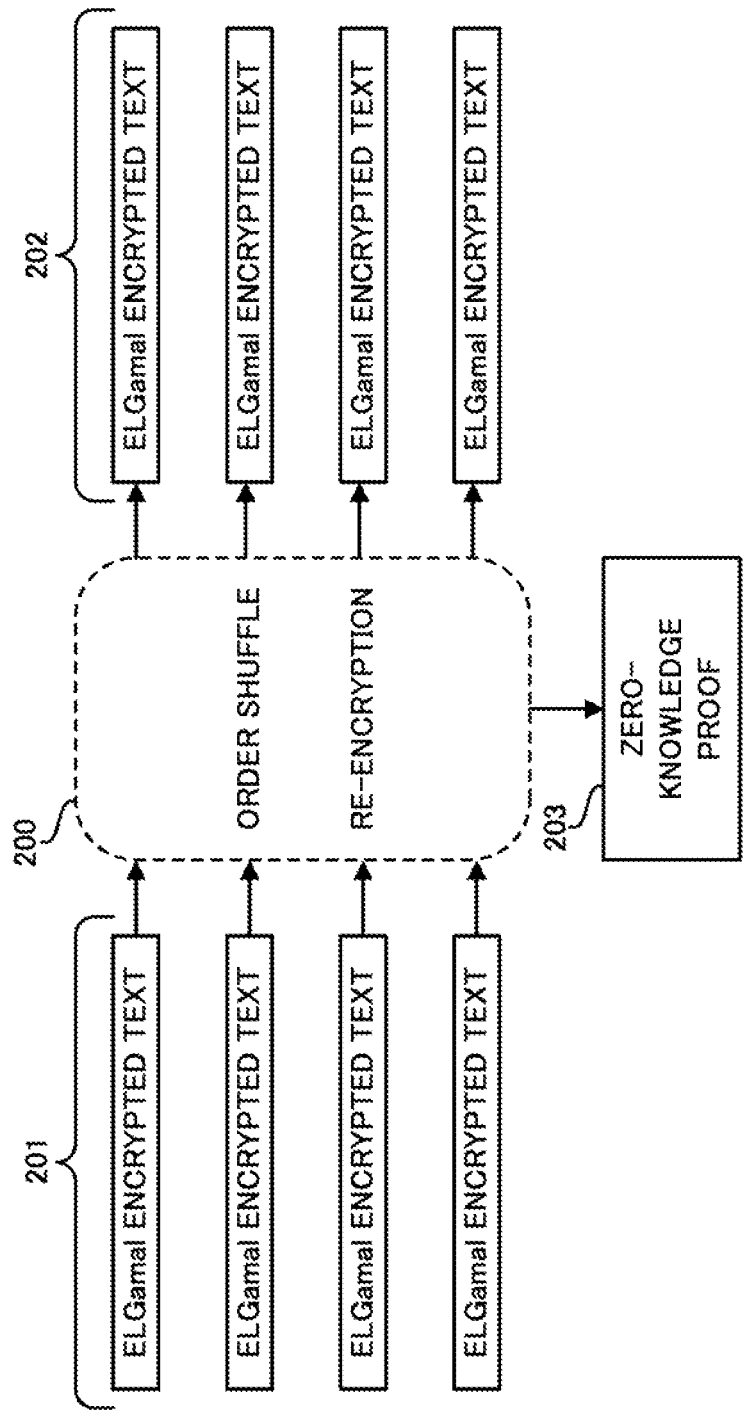
FIG. 11 is a block diagram showing a system disclosed in non-patent literature 2.
Figure 12:
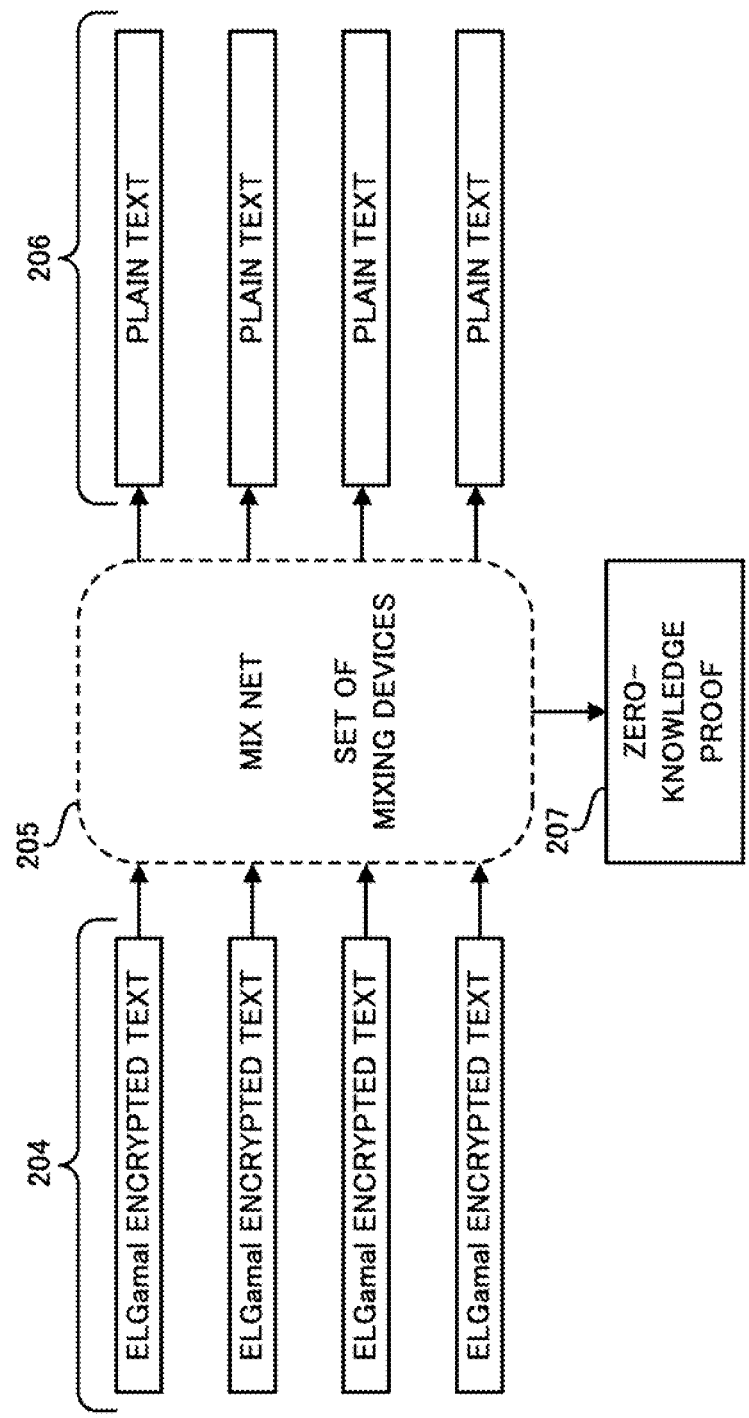
FIG. 12 is a block diagram showing a system disclosed in non-patent literature 2.
Figure 13:
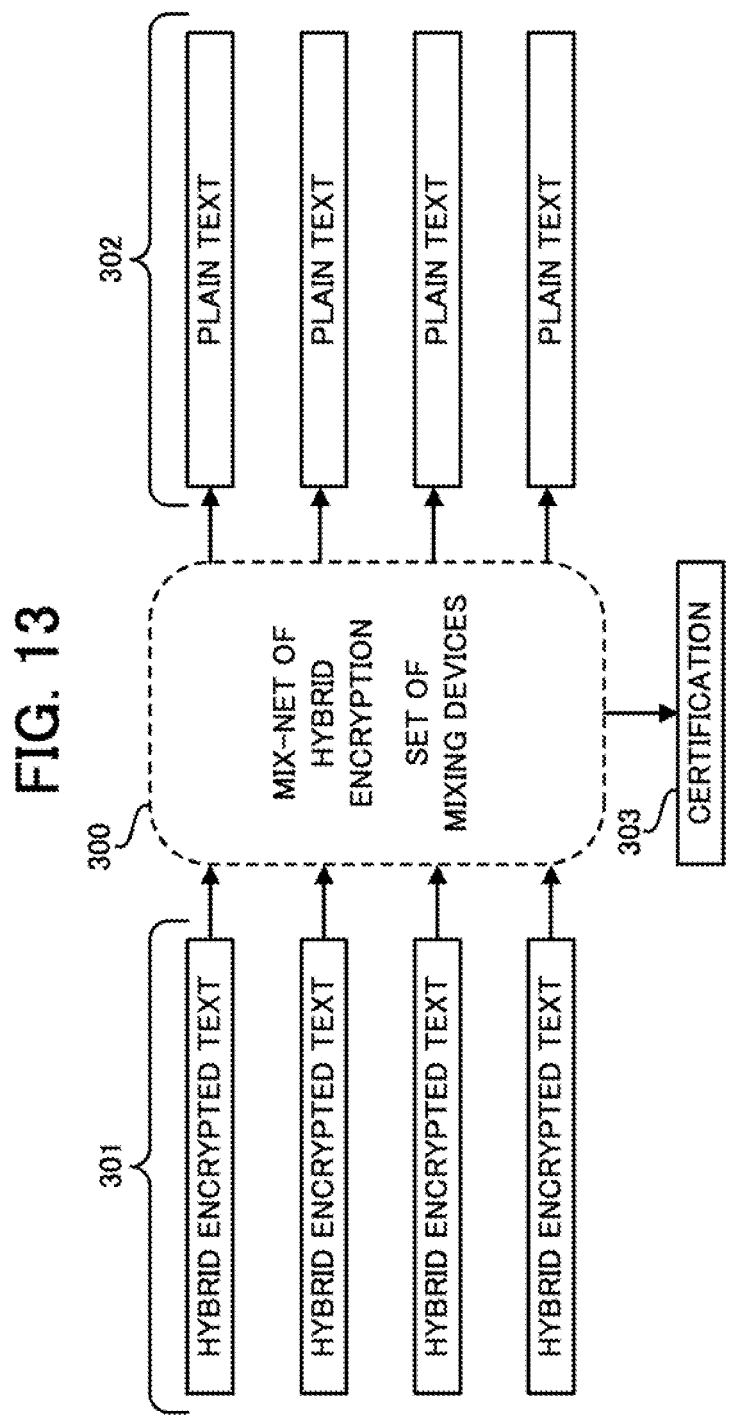
FIG. 13 is a block diagram showing a system disclosed in non-patent literature 3.

Next, a process by the database generating system 800 will be explained in detail with reference to the flowchart of FIG. 9. When the database 804 and the reference-data item set 902 are input (step S31), pieces of data which correspond to all items included in the reference-data item set 902 are selected from all pieces of element data in the database 804, and a sequence of the picked-up data is generated (step S32).

Regarding each picked-up sequence, it is determined whether or not the picked-up sequence is a sequence 905 including an identifier and an encrypted text of pseudonym of the relationship identifier (step S33), and when the sequence is not the encrypted text of pseudonym, the process following step S37 is executed. On the other hand, when the sequence is the encrypted text of pseudonym, an exponentiation processing system 908 executes a following exponentiation process.

Each i-th distributed device 906 generates μ[i], and v[i]∈Z/qZ using a random number 909, generates ε[i]=g^{μ[i]}h^{v[i]} step S34), and generates (a^{μ[i]}, b^{μ[i]}) to all elements, e.g., the ElGamal encrypted texts (a, b) (step S35). Moreover, zero-knowledge proof for truthful execution of an exponentiation process is made (step S36). At this time, a sequence 910 of exponentiation encrypted text of pseudonym that is (a^μ, b^μ) obtained by raising an original pseudonym to a power μ can be obtained relative to all pseudonym encrypted texts (a, b).

$$(a^\mu, b^\mu) = \left( \prod_{i=1}^{H} a^{\mu[i]}, \prod_{i=1}^{H} b^{\mu[i]} \right)$$ [Equation 12]

where $$\mu = \sum_{i=1}^{H} \mu[i]$$

Next, it is determined whether the sequence picked up in the step S32 is a sequence 912 of the hybrid encrypted texts or not (step S37), and when the sequence is the sequence 912 of the hybrid encrypted texts, a mixing processing is performed by a mix-net 913 which is capable of examining the hybrid encrypted text as disclosed in non-patent literature 3 (step S38). On the other hand, when the picked-up sequence is a sequence 905 of pseudonym encrypted texts or a sequence 911 of short encrypted texts, the mixing processing is performed by a mix-net 907 which is capable of examining the ElGamal encrypted text as disclosed in non-patent literature 2 (step S39). The sequence 905 of the pseudonym encrypted texts relating to the identifier is converted into a sequence of encrypted texts generated by raising a pseudonym to a power μ through the process from the step S34 to the step S36. In this case, each distributed device 906 serves as the mixing device.

Moreover, each mixing device performs, for each sequence, zero-knowledge proof that all different sequences are operated by the same order shuffling 914 throughout all sequences (step S40). At the end, the process results of all mix-nets are output as reference data and a certification text 916 (step S41).

Although it is unknown to which element data the sequence of output data corresponds because such data is output through the mix-net, but because the same order shuffling is performed throughout all sequences, it is possible to determine whether or not an element in a different sequence belonged to the same element data. Moreover, because the identifier is subjected to the exponentiation process to the power that is the same number as that of the same pseudonymization process, when an identifier is included in the relationship identifier of another piece of element data, these identifiers are consistent. The determination of the consistency of the identifier is effective when a blood relationship or the like is checked.

As explained above, according to the pseudonymization data reference system that ensures the validity of the database according to the embodiment of the present invention, because identifiers other than a unique identifier are all encrypted and pieces of key for decrypting those identifiers are possessed separately, information on the identifier is not revealed as long as people possessing these keys do not collude. The validity of element data is confirmed because the signature of the creator is added to the element data. Moreover, because this signature discloses only a selected attribute of a signatory, it becomes possible to make only the fact that the signatory is valid known, and thus the unique identifier of each signatory can be hidden. This makes it possible to hide a relationship between the identification unique to data and the signatory from the signatory.

Furthermore, according to the method of referring a part of a database of the embodiment of the present invention, there is an advantage that a correspondence relationship with an identifier is unknown because all pieces of data are output with the orders thereof being shuffled. Furthermore, because the identifier itself is output having undergone pseudonymization, it is possible to check a link among pieces of data having the same relationship identifier with a correspondence relationship to the identifier being kept unknown. Still further, because all sequences are output having undertone the same order shuffling, when equal to or more than two items are included in the reference-data item set, there is an advantage that a correlationship between these items can be easily checked. These processes are all proven by zero-knowledge proof, which suppresses any presentation of false data.

As explained above, the present invention can be in the following forms. The element-data generating device generates a signature to a vector including the encrypted texts, and outputs, as element data, the vector including the encrypted texts and the signature, and the signature includes an encrypted text of an identifier of a signatory and a set of some of attributes permitted to the signatory.

The database generating system includes examining means which examines the signature included in each element data, and the database generating system converts some of encrypted texts in each element data into encrypted texts of data converted with functions each being conclusive by all of the first distributed devices and outputs a sequence of all element data as the database.

The database presentation system includes exponentiation means which converts and raises, for a part of the encrypted text of each element data, each of all elements to a power configuring a sequence by all distributed devices, and order shuffling of elements is performed on reference data of a data sequence having undergone raising by the exponentiation means or of another data sequence by all second distributed devices. Some of the encrypted texts of each element data are the sequence of data relating to the identifier.

The present invention was explained with reference to the specific and exemplified embodiment, but the present invention is not limited to the foregoing embodiment and a modified example thereof. As will be apparent to those skilled in the art, the present invention can be modified and changed in various forms within the scope and the spirit of the present invention which are recited in claims.

This application is the National Phase of PCT/JP2009/068563, filed Oct. 29, 2009, which is based on Japanese Patent Application No. 2008-284777 filed on Nov. 5, 2008, claims for a priority, and entirely incorporates all contents of the disclosure by reference in this specification.

The invention claimed is:

1. A data reference system comprising:
an element-data generating device that generates element data;
a database generating system that collects plural pieces of the element data in order to generate a database; and
a database presentation system that outputs data to be referred from the database, wherein
the element-data generating device encrypts vectors each including plural pieces of data in order to generate a vector including encrypted texts, and outputs the generated vector as the element data,
the database generating system includes a plurality of first distributed devices and outputs a sequence of all pieces of the element data as the database, and
the database presentation system includes a plurality of second distributed devices, generates, based on a reference item that specifies an item to be referred, a plurality of data sequences, the data being to be referred from the database, and performs order shuffling of each of the elements on the data sequences by all of the second distributed devices, wherein the shuffled orders of elements in the data sequences are consistent throughout all of the data sequences.

2. The data reference system according to claim 1, wherein
the element-data generating device generates a signature to a vector including the encrypted texts, and outputs, as the element data, a vector including the encrypted texts and the signature, and
the signature includes an encrypted text of an identifier of a signatory and a set of some of attributes permitted to the signatory.

3. The data reference system according to claim 2, wherein
the database generating system includes examining means which examines the signature included in each of the element data, and
the database generating system converts some of encrypted texts in each of the element data into encrypted texts of data converted with functions each being conclusive by all of the first distributed devices and outputs a sequence of all element data as the database.

4. The data reference system according to claim 3, wherein
the database presentation system includes exponentiation means which raises each of all elements to a power configuring sequences each output by all of the first distributed devices for a part of the encrypted text of each element data, and
the order shuffling of each of the elements is performed on reference data of the data sequence having undergone exponentiation by the exponentiation means or of another data sequence by all of the second distributed devices.

5. The data reference system according to claim 4, wherein some of the encrypted texts in each of the element data is a sequence of data related to the identifier.

6. A database presentation/distribution system comprising a plurality of database presentation devices, wherein
the database presentation device includes communication means which communicates with another database presentation device,
a database, a reference item, a distributed secret key for encryption, a method of shuffling an order, and a public key of the another database presentation device are input to the database presentation system,
the database presentation device includes exponentiation means which generates a plurality of sequences of encrypted texts to be referred from the database based on the reference item, converts some of the encrypted texts in the sequences into encrypted texts obtained by raising all of the encrypted texts in the sequences to a same power and having a consistent decryption result through a communication with the another database, presentation device, and
the database presentation device configures a mix-net in solo or with the another database presentation device by exchanging the sequence of encrypted texts having undergone an exponentiation process by the exponentiation means, and a sequence of reference data in the other encrypted texts with the another database presentation device, and outputs a sequence of encrypted texts by shuffling orders of all of the encrypted texts in the sequence with the same orders.

7. A data reference method comprising:
encrypting vectors each including plural pieces of data by an element-data generating device;
generating a vector including encrypted texts and outputs the generated vector as element data; and
outputting a sequence of all pieces of the element data as a database through a database generating system having a plurality of first distributed devices, wherein
a database presentation system including a plurality of second distributed devices generates, based on a reference item that specifies an item to be referred, a plurality of data sequences, the data being to be referred from the database, and
the second distributed device performs order shuffling of each of the elements on the data sequences, and
the shuffling order of the elements in the data sequences is consistent throughout all of the data sequences.

* * * * *